United States Patent [19]

Joyce et al.

[11] Patent Number: 5,188,279
[45] Date of Patent: Feb. 23, 1993

[54] INERTIA BONDING UTILIZING ALTERNATIVE AXIAL LOAD PATHS

[75] Inventors: Michael J. Joyce, West Hartford, Conn.; Warren M. Boley, Palm Beach Gardens, Fla.; James L. Deal, Amston, Conn.

[73] Assignee: United Technologies Corporation, Hartford, Conn.

[21] Appl. No.: 745,643

[22] Filed: Aug. 15, 1991

[51] Int. Cl.⁵ .............................................. B23K 20/12
[52] U.S. Cl. ........................................ 228/113; 228/2; 279/156; 279/157
[58] Field of Search .................. 228/112, 113, 114, 2; 279/1 S, 51, 58

[56] References Cited

U.S. PATENT DOCUMENTS

| | | | |
|---|---|---|---|
| 3,234,644 | 2/1966 | Hollander | 29/470.3 |
| 3,235,162 | 2/1966 | Hollander | 29/470.3 |
| 3,462,826 | 8/1969 | Farmer et al. | 29/470.3 |
| 3,591,068 | 7/1971 | Farmer et al. | 228/2 |
| 3,599,998 | 8/1971 | Kiwalle et al. | 228/2 |
| 4,365,136 | 12/1982 | Gottlieb | 219/121 |
| 4,387,844 | 6/1983 | Frank | 228/113 |
| 4,741,788 | 5/1988 | Clark et al. | 228/112 |

FOREIGN PATENT DOCUMENTS

| | | | |
|---|---|---|---|
| 204516 | 11/1956 | Australia | 279/1 S |
| 339027 | of 1959 | Switzerland | 279/51 |
| 837586 | 6/1981 | U.S.S.R. | 279/1 S |

Primary Examiner—Richard K. Seidel
Assistant Examiner—Jeffrey T. Knapp

[57] ABSTRACT

A method for inertia welding axially symmetric articles while controlling the gripping force applied to the rotating component is described. A spacer inserted into the rotating headstock creates an alternative path for the axial force in excess of that required for causing gripping of the rotating component, and thus minimizes distortion of the inertia welded article. This is particularly useful in welding high strength superalloy articles, where extremely high axial forces are required to produce an adequate weld joint.

4 Claims, 3 Drawing Sheets

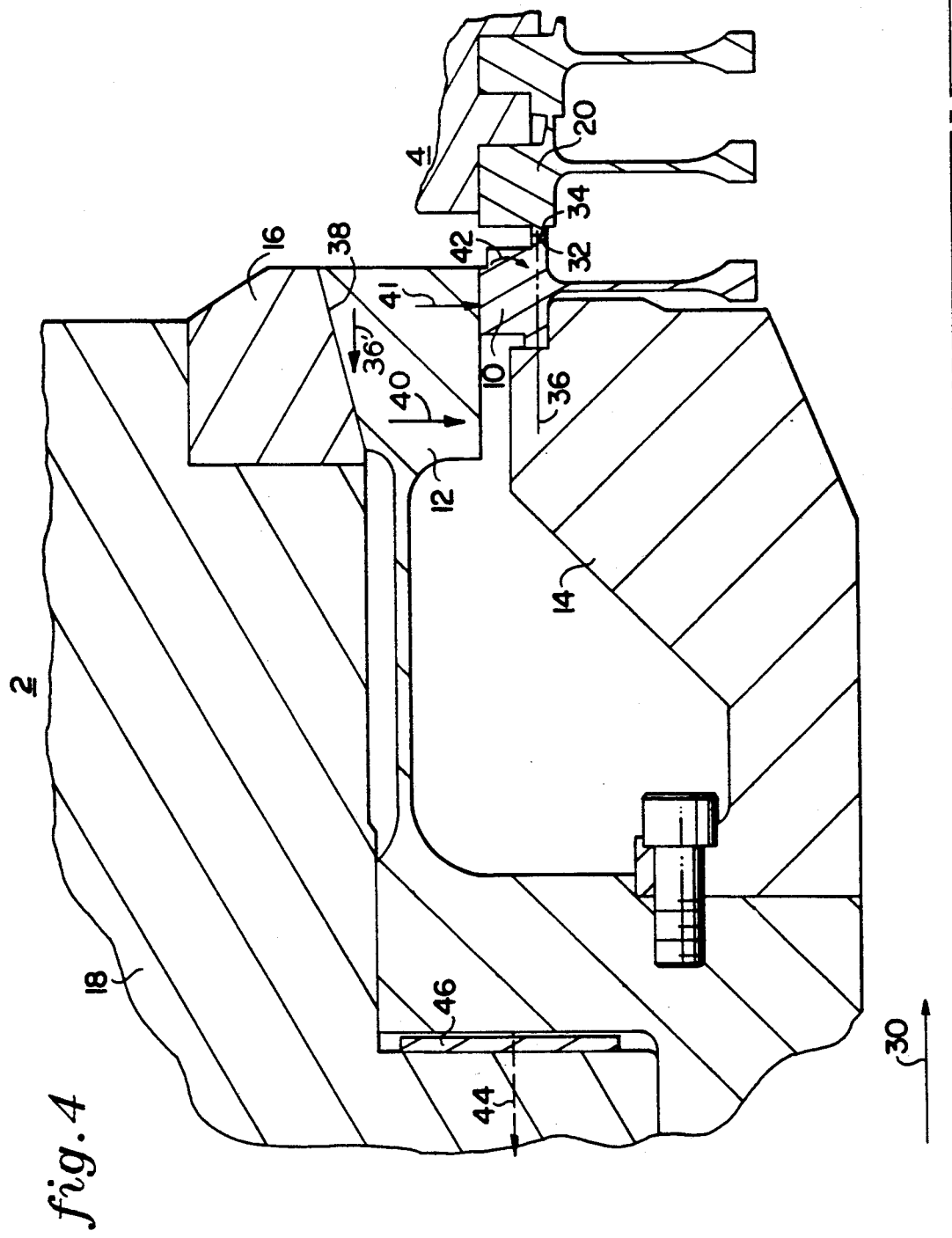

INERTIA BONDING UTILIZING ALTERNATIVE AXIAL LOAD PATHS

This invention was made with Government support under a contract awarded by the Department of the Air Force. The Government has certain rights in this invention.

DESCRIPTION

1. Technical Field

This invention relates to the inertia welding of hollow articles. This invention also relates to the control of gripping pressure on the workpiece during inertia welding, and to the inertia welding of high strength superalloy articles.

2. Background Art

Inertia welding is a process used to join metallic components which are generally symmetrical about an axis of rotation. Such components may be solid or hollow. Thus for example inertia welding can be used to join components together to form an article such as a crankshaft or a welded hollow tube assembly. The inertia welding process is described for example in U.S. Pat. Nos. 3,234,644; 3,235,162; 3,462,826; 3,591,068; and 4,365,136, which are incorporated herein by reference.

Briefly, in inertia welding the components to be joined are located and positioned so that their axes of symmetry coincide and the surfaces to be joined are in a parallel relationship. One of the components is held stationary, the other is attached to a rotatable flywheel. The rotatable component-flywheel combination is accelerated to a predetermined rotational speed, the source of rotational power is removed, and the rotating component is forced against the stationary component. The flywheel geometry, mass and rotational speed determine the available kinetic energy, and this kinetic energy is dissipated (converted into thermal energy) by friction between the components to be joined. The components are forced together and the temperature increase due to the dissipated kinetic energy causes localized softening. When the flywheel rotation stops, the force between the components is maintained or increased permitting the softened portions of the components to join together. The force between the components causes plastic or superplastic deformation in the weld zone, resulting in expulsion of a significant amount of material from the weld zone, thus inherently removing detrimental surface contamination. Cooling of the weld zone by conduction of heat into the components occurs fairly rapidly.

The microstructure of the inertia weld zone is more characteristic of a forging than a casting, because the material in the weld zone does not melt during the inertia welding operation. Weld zones produced by other forms of welding, such as laser, electron beam and electric or gas fusion welding, have been melted and resolidified, and have the characteristics of a casting. Weld zones with the characteristics of a casting are generally less desirable than those with the characteristics of a forging, primarily due to segregation of the alloying elements during the resolidification process.

Inertia welding is a form of friction welding. Another form of friction welding relies on a continuous motor drive, rather than flywheel-stored energy, to provide frictional heating. As used herein the term inertia welding includes other forms of rotational friction welding.

Inertia welding was initially developed and has been widely used in joining ferrous materials such as iron and steel in the heavy construction equipment industry. Inertia welding has been further developed to join non-ferrous metals such as aluminum and titanium in the fabrication of one-piece multiple disk drum rotors for gas turbine engines. A typical equipment set-up such as shown in FIG. 1 is commonly used for the inertia welding of drum rotors. A rotating headstock 2 and a stationary tailstock 4 (both partially shown) hold the components to be assembled. An annular disk 10 is mounted in a segmented, conically-shaped collet 12 in the headstock 2, with a disk back-up 14 positioned to provide support to the disk 10. A collet seat 16, conically shaped to match the collet 12, is positioned so as to interact with the collet 12. The disk 10 is caused to rotate by a mechanism (not shown) which imparts a rotating motion to the collet 12, the disk back-up 14, the collet seat 16 and a flywheel 18. The flywheel 18 is sized to provide the appropriate amount of kinetic energy to facilitate the welding process.

Typically the disk 10 is inertia welded to a partial drum 20 consisting of disks which have been inertia welded in prior operations. The partial drum 20 is mounted on the stationary tailstock 4.

During the inertia welding operation, the disk 10 is rotated by setting the headstock 2 into motion. When the headstock reaches the appropriate rotational velocity, the rotational force is terminated and the headstock rotates freely. An axial force represented by the arrow 30 is applied to the headstock so as to bring the surface 32 of the disk 10 into contact with the surface 34 of the partial drum 20. The kinetic energy stored in the rotating headstock 2 is dissipated by the friction developed between the surfaces 32, 34. The friction generates sufficient heat at the interface between the surfaces 32, 34 to cause welding of the disk 10 to the partial drum 20.

As the axial force 30 brings the disk 10 into contact with the partial drum 20, a reactive force represented by the arrow 36 is created. The effect of this reactive force is to move the collet 12 relative to the collet seat 16. This relative movement along the conical interface 38 between the collet 12 and the collet seat 16 causes the segments of the collet 12 to move radially inwardly and increase the applied radial force 40 on the disk 10. This increased radial force insures that the disk will not slip relative to the rotating headstock when the disk 10 is brought into contact with the partial drum 20 to produce the inertia welding action.

The action of the applied radial force 40 on the outside diameter of the disk 10 produces a radial gripping force represented by the arrow 41 and a moment represented by the arrow 42. The moment occurs because the disk back-up 14 does not fully resist the radial force 40. The radial gripping force and moment result in a distortion of the disk 10, which is locked into the drum rotor after the heated material at the weld interface has cooled. The distortion produced is hereinafter referred to as dishing.

For materials such as aluminum and titanium where the high temperature strength of the material is low enough that a relatively low axial force is sufficient to soften the metal during the inertia welding process, the resultant dishing is relatively small and can generally be maintained within design tolerances. For higher strength superalloys (i.e., those having yield strengths in excess of 100 ksi at 1,000° F.), the axial force 30 required to generate sufficient heat at the weld interface to produce an inertia weld is so high that the radial force created by the gripping action of the collet 12 on the outer diameter of the disk 10 creates distortion in the disk which cannot generally be held within design tolerances.

Although the dishing caused during the inertia welding of aluminum and titanium drum rotors is usually held within design tolerances, it will be apparent to one of average skill in the art that reducing the degree of distortion in rotors, as well as in other types of inertia welded articles, would produce an even better final result. It will also be apparent that excessive applied radial forces can cause other problems, such as damage to the surface of the component being gripped in the headstock. If the radial force could be restricted to the level necessary for preventing slippage of the component in the headstock collet, these other types of damage could be controlled more easily.

Accordingly, it is an object of the invention to describe a method for inertia welding axially symmetric articles while controlling the applied radial force generated in the rotating headstock. It is another object of the invention to describe a method of inertia welding drum rotors for gas turbine engines from high strength (and/or powder metallurgy process) superalloys while minimizing the distortion or dishing of the disk.

DISCLOSURE OF INVENTION

Referring to FIG. 4, the axial force 30 required to satisfactorily inertia weld the adjacent disks in a superalloy drum rotor was determined to generate an applied radial force 40 on the disk 10 through the collet 12 greatly in excess of that required for gripping the disk to prevent slippage relative to the rotating headstock 2. This excess force resulted in dishing of the disk 10 after it had been welded to the partial drum 20, with the dishing exceeding the dimensional tolerance.

According to the present invention, the magnitude of the applied radial force 40 applied to the disk 10 is controlled by providing a secondary load path 44 once a satisfactory gripping load has been achieved. The secondary load path is created by the insertion of a spacer 46 between the headstock collet 12 and the flywheel 18. The spacer 46 is sized such that the collet 12 moves relative to the collet seat 16 until it bottoms out against the spacer when a predetermined level of axial load has been applied to the disk 10. By this means, the axial force 30 in excess of that required to provide adequate gripping of the disk 10 is transmitted directly to the headstock 2 rather than through the collet 12, and the applied radial force 40 is limited to the level of force necessary to prevent the disk from slipping in the collet 12.

The foregoing and other features and advantages of the present invention will become more apparent from the following description and the accompanying drawings.

BRIEF DESCRIPTION OF DRAWINGS

FIG. 4 shows the inertia welding machine of FIG. 1 modified to control the radial clamping force on the rotating component.

BEST MODE FOR CARRYING OUT THE INVENTION

Figure 1:
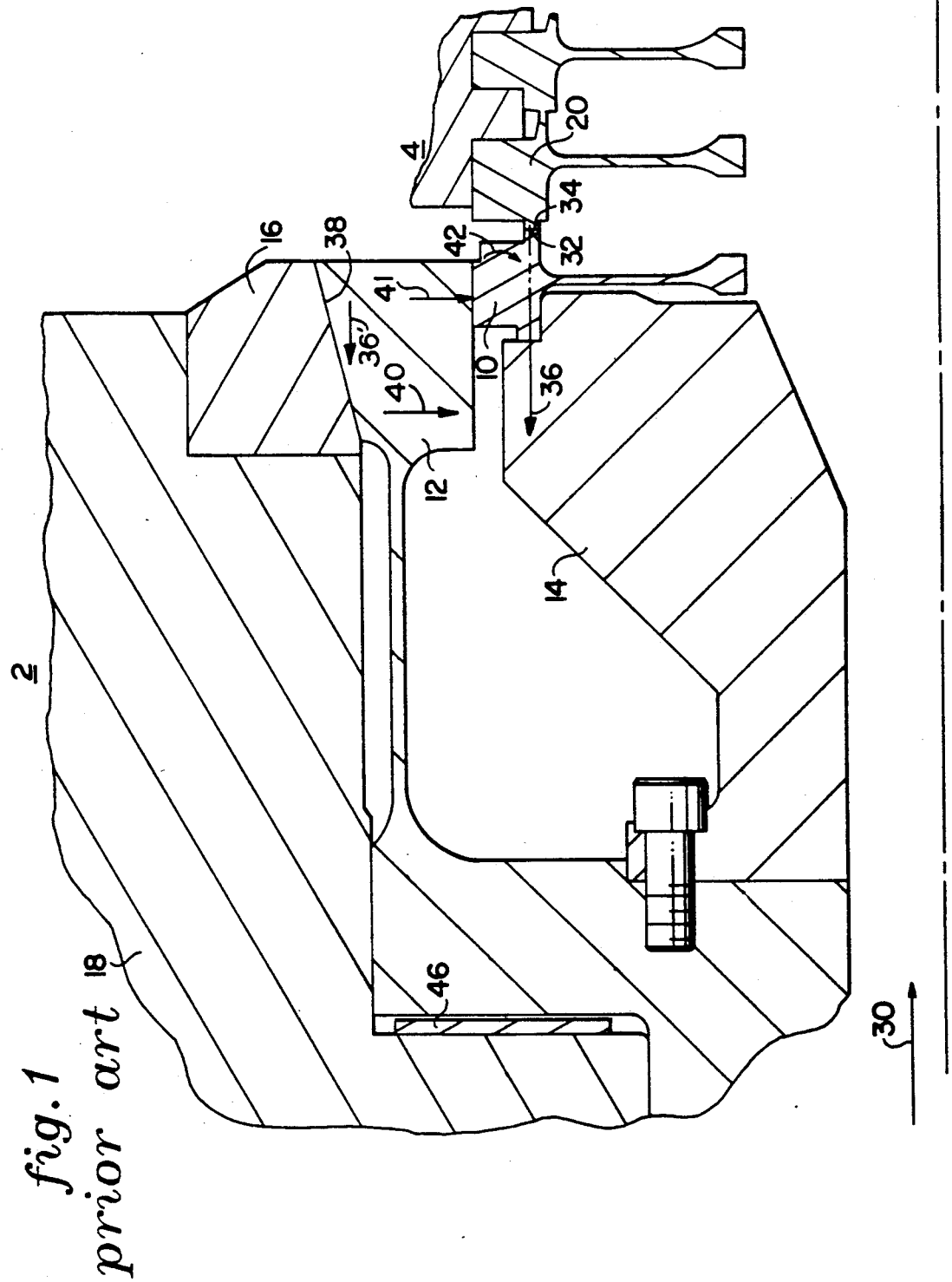
FIG. 1 is a partial cross-sectional view of an inertia welding machine as set up for bonding drum rotors for gas turbine engines.

In a conventional inertia welding machine, such as depicted in FIG. 1, the reactive force 36 transmitted through the interface between the two stages in the drum rotor is transmitted from the collet 12 to the collet seat 16, as represented by the arrow 36'. This creates an applied radial force 40.

For the inertia welding of lower strength materials such as aluminum and titanium, the axial force required to adequately inertia weld the stages is of a magnitude which provides an applied radial force 40 on the disk 10 which is generally not detrimentally greater than that required for the prevention of slippage of the disk 10 in the rotating headstock 2. Thus, the applied radial force 40 on the disk is not of a magnitude which causes significant dishing of the disk.

Figure 2:
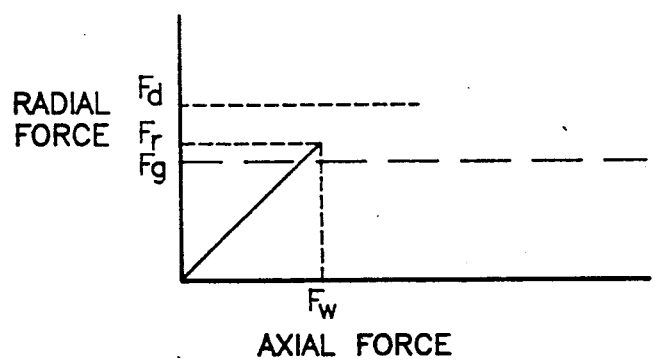
FIG. 2 shows a graph depicting the applied radial force as a function of the axial force for inertia welding a typical lower strength material.

This is depicted in FIG. 2, which shows that the axial force $F_w$ necessary to inertia weld components of lower strength materials produces a radial force $F_r$ which is greater than the minimum radial force $F_g$ required to prevent slipping, but not as great as the force $F_d$ required to cause excessive distortion.

When inertia welding disks made of high strength superalloys, the axial force 30 required to adequately inertia weld the stages is much larger than for lower strength materials, because the alloys must be heated to a higher temperature to prepare the material for the inertia welding process to occur. The reactive force 36' transmitted through the conically shaped collet 12 generates a radial force 40 on the disk 10 which is sufficiently in excess of the minimum force required to prevent slippage of the disk 10 in the rotating headstock 2 that distortion or dishing of the disk occurs.

Figure 3:
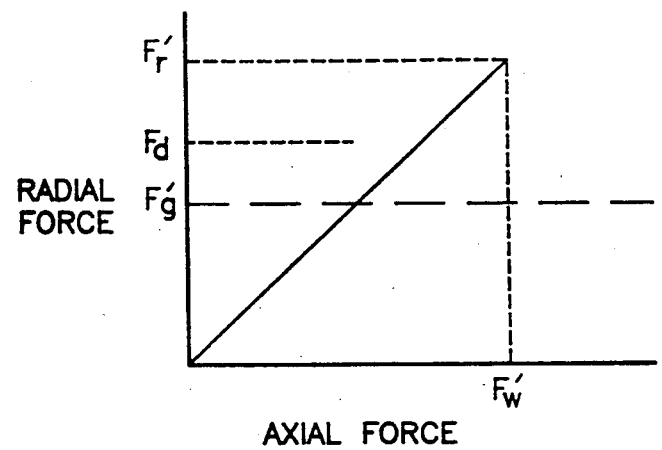
FIG. 3 shows a graph depicting the applied radial force as a function of the axial force for inertia welding a typical high strength superalloy material.

This is depicted in FIG. 3, which shows that the axial force $F_w'$ necessary to inertia weld components of high strength superalloys produces a radial force $F_r'$ which is much greater than the minimum radial force $F_g'$ necessary to prevent slipping, and also greater than the force $F_d'$ required to cause excessive distortion.

The essential aspect of the invention is that the radial force applied to the disk by means of the conically shaped collet can be controlled by limiting the travel of the collet. By inserting a precisely dimensioned spacer between the collet and the flywheel, the axial force in excess of that required to generate the necessary radial force is directed along a secondary path to bypass the conically shaped collet.

Referring to FIG. 4, by causing the collet 12 to bottom out against a spacer 46 positioned between the collet 12 and the flywheel 18 after a predetermined axial force has been applied, a secondary path 44 is created which limits the applied radial force 40 generated by the collet 12 on the disk 10 to the force existing at the time the collet 12 bottoms out on the spacer 46. Any further increase in axial force necessary to perform the inertia welding operation is thus transmitted directly to the flywheel 18 without passing through the collet 12. In this manner, the axial force necessary for inertia welding can be applied, while the excessive radial forces which would cause excessive dishing of the disk 10 are avoided.

Figure 5:
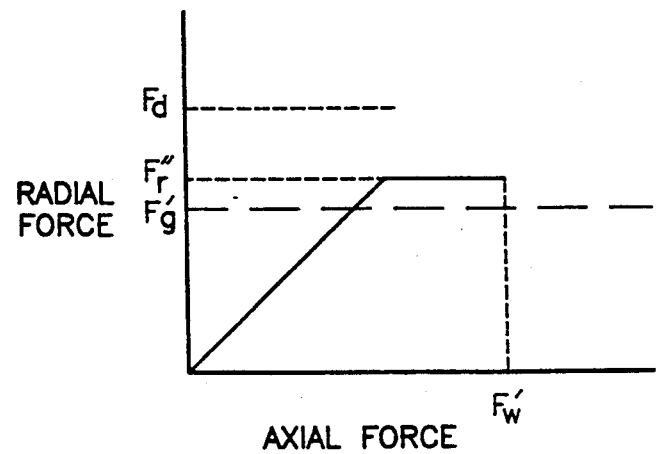
FIG. 5 shows a graph depicting the applied radial force as a function of the axial force for inertia welding a typical high strength superalloy in an inertia welding machine modified according to the invention.

This is depicted in FIG. 5, which shows that the effect of the spacer is to permit the axial force $F_w'$ necessary to inertia weld components of high strength superalloys to produce a radial force $F_r'$ which is greater than the minimum radial force $F_g'$ necessary to prevent slipping, but less than the force $F_d'$ required to cause excessive distortion. The bottoming out of the collet on the spacer directs the excess reactive force along an alternate path away from the collet, thus preventing any further increase in the radial force, and preventing the excessive dishing previously encountered.

The invention will be better understood by reference to the following illustrative example.

EXAMPLE I

A drum rotor for a gas turbine engine high pressure compressor, made of IN100, a nickel-base superalloy with a nominal composition, by weight, of 12.4% Cr, 18.5% Co, 4.3% Ti, 5.0% Al, 3.2% Mo, 0.8% V, 0.06% Zr, 0.02% B, 0.07% C, balance Ni, was inertia welded using the equipment described in FIG. 1. An axial force was applied to the rotating headstock. The resulting radial force produced an inertia bonded drum rotor which was dished 0.012 inches.

EXAMPLE II

A similar drum rotor as in Example I was inertia welded using the same equipment modified as shown in FIG. 2. The same axial force was applied to the rotating headstock. The resulting controlled radial force produced an inertia bonded drum rotor which was dished 0.003 inches.

It will be apparent to one of average skill in the art that the size of the radial clamping force 40 applied to the disk 10 is a function of the thickness of the spacer 46, because the amount of axial force necessary to create the contact between the collet 10 and the spacer 12 increases as the thickness of the spacer 12 decreases. It will also be apparent that the location of the spacer 46 may vary, depending on the design of the particular inertia welding machine.

Although a spacer of predetermined dimension has been described as a means for limiting headstock collet travel, it will be obvious to one of average skill in the art that other means, for example adjustable stops, could be employed to perform the same function of limiting the travel of the headstock collet during the application of an axial force.

Although a change in the cone angle of the collet and collet seat would have accomplished the same result, this would have required a different cone angle for each different material and configuration combination, which would have entailed considerable expense. By inserting spacers of different thicknesses, the desired result can be achieved economically by utilizing the original equipment.

While the invention has been described in relation to an inertia welding machine which employs a conical segmented collet and a matching collet seat to provide the gripping force to prevent the rotating component from slipping during the inertia welding operation, the same gripping function would be required on any inertia welding machine which employs a radial gripping means where the radial force generated is a function of the applied axial force.

Although this invention has been shown and described with respect to detailed embodiments thereof, it will be understood by those skilled in the art that various changes in form and detail thereof may be made without departing from the spirit and scope of the claimed invention.

We claim:

1. An inertia welding machine which includes a headstock, a flywheel, and a headstock collet, wherein the improvement comprises a means for limiting the radial clamping force on a component placed in said headstock collet by limiting the axial travel of said headstock collet to a distance which provides a gripping force great enough to prevent slippage of said component during said inertia welding operation, but not great enough to cause excessive distortion in said component.

2. An inertia welding machine as recited in claim 1, further characterized by limiting said axial travel by means of positioning a spacer of predetermined thickness between said headstock collet and said flywheel such that said headstock collet bottoms out on said spacer when a radial gripping force adequate to prevent slipping of said rotating component has been reached.

3. An inertia welding machine as recited in claim 1, further characterized by limiting said axial travel by means of an adjustable travel limiting means positioned between said headstock collet and said flywheel such that said headstock collet bottoms out on said travel limiting means when a radial gripping force adequate to prevent slipping of said rotating component has been reached.

4. A method of controlling dishing during the inertia welding of a drum rotor for a gas turbine engine in an inertia welding machine in which the radial gripping force increases as the axial force increases and which includes a headstock, a headstock collet and a flywheel wherein the improvement comprises creating a secondary path for said axial force by bottoming out said headstock collet on a spacer positioned between said headstock collet and said flywheel when a radial gripping force adequate to prevent slipping of said rotating component has been reached, after which said radial gripping force remains essentially constant as said axial force continues to increase.

* * * * *